Figure 1:
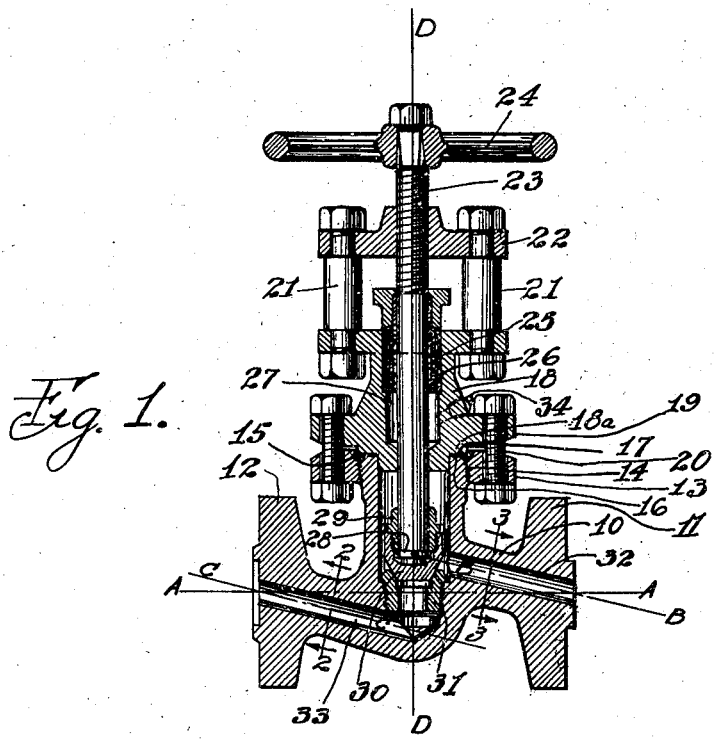

Sept. 20, 1932.  W. W. MOHR  1,878,288

FORGED STEEL VALVE

Filed Oct. 20, 1930

INVENTOR.
WALTER W. MOHR

BY Albert C. Bell

ATTORNEY.

Patented Sept. 20, 1932

1,878,288

UNITED STATES PATENT OFFICE

WALTER W. MOHR, OF CHICAGO, ILLINOIS, ASSIGNOR TO THE EDWARD VALVE AND MANUFACTURING COMPANY, OF EAST CHICAGO, INDIANA, A CORPORATION OF ILLINOIS

FORGED STEEL VALVE

Application filed October 20, 1930. Serial No. 489,784.

My invention relates to a construction of forged steel valve for use with high fluid pressures and temperatures. Forged steel valves of the kind referred to, are frequently required to control the flow of fluids under high pressure, for example from nine hundred pounds per square inch to thirteen hundred and fifty pounds per square inch or higher, with correspondingly high temperatures of the fluid. The only practical constructions that will meet these extreme working requirements, are valves in which the bodies are forced from steel by means of suitable dies, the resulting blanks being solid and the necessary compartment for the valve mechanism per se, and the passages for fluid flow, being subsequently made in the solid blank by drilling operations in connection with finishing the body blank for use.

In making valves of this kind, as a result of the large metal masses heretofore regarded as essential in order to successfully forge the valve bodies in the dies employed, many difficulties have been experienced among which may be mentioned distortion of the valve body and attached parts by the large and unequal expansions and contractions of the several parts of the valve body due to the high temperatures of the fluids the flow of which is controlled by the valves, and loosening of parts of the structure due to these unequal expansions and contractions.

By my invention I accomplish two general results: first, I dispose the fluid flow lines through the valve body to afford the shortest path for fluid flow through the valve body and minimum changes of direction of fluid flow through the valve body, consistent with effectively controlling the flow of the fluid by the valve; and second, I provide substantially uniform distribution of metal of the valve body, around the lines of fluid flow, to the end that unequal contractions and expansions of the valve body will be eliminated, and that the valve body will be equally resistant to bending movements laterally of the axis of the pipe line in any direction.

In carrying out my invention, four axes of reference are recognized. First, the axis of the pipe line in which the valve is connected and with which the end flanges of the valve body are perpendicular; second, the axis of the fluid flow passage to the interior of the valve body; third, the axis of the fluid flow passage from the interior of the valve body; and fourth, the axis of the valve stem which may or may not be perpendicular to the axis of the pipe line. It is to be borne in mind that all of the passages and compartments made in the valve body after it is formed by the forging and trimming dies, must of necessity be made by drilling and reaming operations, there being no possibility of coring valve bodies of the kind under consideration, which coring practice is common with cast metal valve bodies and permits all of the internal compartments and passageways in the valve body to be made with ease, and also permits any desired metal distribution in the valve body to be readily effected. By my invention, I drill a fluid passageway through each end flange, the axis of one of these passageways being inclined upwardly from the axis of the pipe line and the axis of the other fluid passageway being inclined downwardly from the axis of the pipe line, both of these fluid passageways constituting single straight bores extending from the outer faces of the end flanges into a vertical bore in the valve body made to receive the valve mechanism, the separation of the inner ends of the fluid passageways being just sufficient so that the upper one enters the vertical bore just above the valve seat, and the lower one enters the vertical bore just below the valve seat, the valve seat being preferably centrally disposed about the intersection of the axis of the pipe line and the stem axis, so that the axes of the fluid passageway may make substantially equal angles with the pipe line. In this manner the factors determining the angle of the fluid passageways with the axis of the pipe line, are the end to end dimension of the valve body over its end flanges, and the height of the valve seat member.

In carrying out my invention, the end flanges are symmetrical about the axis of the pipe line to effectively connect the valve body with the adjacent flanges of the pipe line, and adjacent each end flange, the metal distribution of the valve body is substantially symmetrical about the axis of the corresponding fluid passageway, as far as this can be effected and at the same time impart to the valve body the requisite strength to withstand the stresses to which it may be subjected, which are internal resulting from the fluid pressure and external resulting from the weight of the pipe line, its manner of support, and accidental stresses which may be communicated to the pipe line and valve externally. In this manner I produce substantially uniform contraction and expansion of the valve body, resulting from the high temperatures of the fluid with which the valve is used, and a substantially uniform distribution of internal stresses withstanding the internal and external forces which may be applied to the valve when in use.

Figure 2:
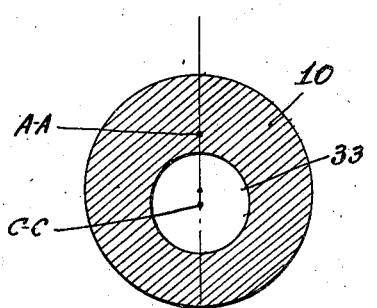
Figure 3:
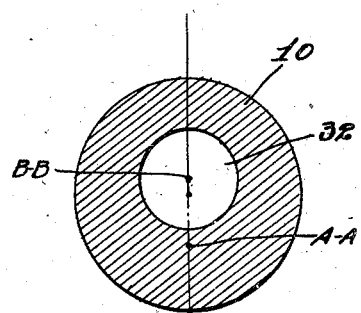

The above and other features of my invention will best be understood by reference to the accompanying drawing showing a preferred embodiment thereof, in which Fig. 1 illustrates in vertical, central, sectional view, a forged steel valve in accordance with my invention, Fig. 2 is a sectional view through the valve body shown in Fig. 1, to an enlarged scale, taken along the line 2—2, and Fig. 3 is a sectional view through the valve body shown in Fig. 1 to an enlarged scale, taken along the line 3—3.

Similar numerals refer to similar parts throughout the several views.

As shown in Fig. 1, I illustrate a forged steel valve having a body 10 provided with integral end flanges 11 and 12 and a bonnet flange 13 screwed to the upper end of the body at 14, the joint being welded at 15 preferably by electric welding, to the end that the heat of welding is localized and danger of loosening the screw joint by the welding operation is reduced to a minimum. The upper end of the body 10 is provided with a shouldered seat 16 extending into the welding material 15, to receive a gasket 17 and a stepped portion 18a of the bonnet 18, the lower end of the bonnet being provided with a flange 19 connected by bolts 20 with the flange 13 to hold the bonnet in place on the upper end of the valve body 10. The bonnet 18 has extending therefrom pillars 21 supporting a yoke 22 above the upper end of the bonnet, said yoke being threaded to engage the external threaded valve stem 23 which carries on its upper end a hand wheel 24. The bonnet is provided with a stuffing box 25 resting against a metal ring 26 at its lower end, held in place by a shoulder in the bore in the bonnet 18, leaving a condensation chamber 27 below the stuffing box. The lower end of the valve stem 23 carries a collar 28, above which a sleeve 29 is loosely supported on the stem and provided with external threads at its lower end to receive the internal threads of the valve member 30 which loosely surrounds the collar 28. The valve member 30 co-operates with a valve seat 31 threaded into a bore therefor in the body 10, which is coaxial with the stem 23. A first passage for fluid flow 32, extends through the flange 11 and into the vertical fore of the body 10 just above the valve seat 31 and a second passage 33 extends through the flange 12 and into the lower end of the vertical bore in the body 10 just below the valve seat 31. The various bores in the body 10 are drilled and finished after the blank of the body is formed by forging by suitable dies.

When the valve is in its fully opened position, the upper end of the sleeve 29 is tightly pressed against the lower end of the bonnet 18 to prevent fluid flow into the chamber 27, and the chamber 27 is provided with a screw plug 34 which may be removed to test for pressure in the chamber 27, should it be desired to repack the stuffing box 25 when fluid pressure is on the pipe line with which the valve is in use. The chamber 27 constitutes a protection for the packing in the stuffing box 25, which is found desirable where high pressure high temperature fluid is controlled by the valve, to the end that the heat will be largely radiated before the fluid comes in contact with the packing material.

The axis of the pipe line with which the valve is connected is shown at A, A, the axis of the fluid passageway leading into the valve body above the valve seat 31 is shown at B, B, the axis of the fluid passageway leading into the valve body below the valve seat 31 is shown at C, C, and the axis of the valve stem is shown at D, D. While the problem of uniform expansion and contraction would require symmetrical metal distribution about the axis C, C, and about the axis B, B, it is to be borne in mind that bending moments exerted upon the valve body by external forces applied to the piping or valve body, will be about the axis A, A, which cannot be coincident with the axes B, B and C, C. To compensate for this and to make the valve body equally strong against such bending moments in all directions, the metal of the valve body at the section 2—2, is somewhat thicker above the axis C, C than it is below said axis, since the upper wall is nearer the axis A, A than is the lower wall. Similarly, the section of the valve body at the section 3—3, is somewhat thicker below the axis B, B than it is above said axis, since the lower wall is nearer the axis A, A than is the upper wall. These differences however are not sufficient to introduce noticeable inequalities in the contraction and expansion strains in the body structure, and the result is that the central mass of the body structure surrounding the valve seat is freed from unequal contraction and expansion stresses and the valve seats remain securely in place when in use, whereas heretofore with unequal metal distributions, they frequently become loose when in use.

While I have shown my invention in the particular embodiment above described, it will be understood that I do not limit myself to this exact construction as I may employ equivalents known to the art at the time of the filing of this application without departing from the scope of the appended claims.

What I claim is:

1. In a forged steel valve, a forged steel body having a drilled compartment for a valve seat, substantially parallel pipe connection flanges, and straight drilled passages through said flanges into said compartment above and below the valve seat location, said passages being at oblique angles to the axes of said flanges, the metal distribution around the axes of said passages affording substantially uniform heat contraction and expansion effects and substantially uniform lateral strength of said body around the axes of said flanges.

2. In a forged steel valve, a forged steel body having a drilled compartment for a valve seat, substantially parallel pipe connection flanges, and straight drilled passages through said flanges into said compartment above and below the valve seat location, said passages being at oblique angles to the axes of said flanges, the metal distribution around the axes of said passages affording substantially distortionless heat contraction and expansion of the body portion around said compartment.

3. In a forged steel valve, the combination of a forged steel body having a drilled compartment for a valve seat, substantially parallel pipe connection flanges, and straight drilled passages through said flanges into said compartment above and below the valve seat location, said passages being at oblique angles to the axes of said flanges, and a valve seat in said compartment, whereby there are but two changes in the direction of fluid flow through said body, the metal distribution about the axis of each of said passages being substantially uniform.

4. In a forged steel valve, a forged steel body having a drilled compartment for a valve seat, substantially parallel pipe connection flanges having a common axis, and straight drilled passages through said flanges into said compartment above and below the valve seat location, said passages being at oblique angles to the axes of said flanges, the metal distribution around the axes of said passages affording substantially uniform heat contraction and expansion effects and substantially uniform lateral strength of said body around the axes of said flanges.

5. In a forged steel valve, a forged steel body having a drilled compartment for a valve seat, substantially parallel pipe connection flanges having a common axis, and straight drilled passages through said flanges into said compartment above and below the valve seat location, said passages being at oblique angles to the axes of said flanges, the metal distribution around the axes of said passages affording substantially uniform heat contraction and expansion effects and substantially uniform lateral strength of straight drilled passages through said flanges said metal distribution around said passages axes being substantially symmetrical and reversed relatively to each other.

6. In a forged steel valve, the combination of a forged steel body having a drilled compartment for a valve seat, substantially parallel pipe connection flanges, and straight drilled passages through said flanges into said compartment above and below the valve seat location, said passages being at oblique angles to the axes of said flanges, and a valve seat in said compartment, whereby there are but two changes in the direction of fluid flow through said body, the metal distribution about the axis of each of said passages being substantially uniform, the angles between said passages axes and the axes of said flanges being the minimum possible with any required height of valve seat and the dimension between the outer faces of said flanges.

7. In a forged steel valve, the combination of a forged steel body having a drilled compartment for a valve seat, substantially parallel pipe connection flanges, and straight drilled passages through said flanges into said compartment above and below the valve seat location, said passages being at oblique angles to the axes of said flanges, and a valve seat in said compartment, whereby there are but two changes in the direction of fluid flow through said body, the metal distribution about the axis of each of said passages being substantially uniform, said passages entering said compartment immediately adjacent the upper and lower ends of said valve seat.

8. In a forged steel valve, the combination of a forged steel body having a drilled compartment for a valve seat, substantially parallel pipe connection flanges, and straight drilled passages through said flanges into said compartment above and below the valve seat location, said passages being at oblique angles to the axes of said flanges, and a valve seat in said compartment, whereby there are but two changes in the direction of fluid flow through said body, the metal distribution about the axis of each of said passages being substantially uniform, said passages entering said compartment immediately adjacent the upper and lower ends of said valve seat and at their outer ends being substantially centered in the corresponding flanges.

9. In a forged steel valve, a forged steel body having a drilled compartment for a valve seat, substantially parallel pipe connection flanges having a common axis, and straight drilled passages through said flanges into said compartment above and below the valve seat location, said passages being at oblique angles to the axes of said flanges, the metal distribution around the axes of said passages affording substantially distortionless heat contraction and expansion of the body portion around said compartment.

10. In a forged steel valve, a forged steel body having a drilled compartment for a valve seat, substantially parallel pipe connection flanges having a common axis, and straight drilled passages through said flanges into said compartment above and below the valve seat location, said passages being at oblique angles to the axes of said flanges, the metal distribution around the axes of said passages affording substantially distortionless heat contraction and expansion of the body portion around said compartment, said metal distribution around said passages axes being substantially symmetrical and reversed relatively to each other.

11. In a forged steel valve, the combination of a forged steel body having a drilled compartment for a valve seat, substantially parallel pipe connection flanges having a common axis, and straight drilled passages through said flanges into said compartment above and below the valve seat location, said passages being at oblique angles to the axes of said flanges, and a valve seat in said compartment, whereby there are but two changes in the direction of fluid flow through said body, the metal distribution about the axis of each of said passages being substantially uniform.

12. In a forged steel valve, the combination of a forged steel body having a drilled compartment for a valve seat, substantially parallel pipe connection flanges having a common axis, and straight drilled passages through said flanges into said compartment above and below the valve seat location, said passages being at oblique angles to the axes of said flanges, and a valve seat in said compartment, whereby there are but two changes in the direction of fluid flow through said body, the metal distribution about the axis of each of said passages being substantially uniform, said metal distribution around said passages axes being substantially symmetrical and reversed relatively to each other.

13. In a forged steel valve, the combination of a forged steel body having a drilled compartment for a valve seat, substantially parallel pipe connection flanges having a common axis, and straight drilled passages through said flanges into said compartment above and below the valve seat location, said passages being at oblique angles to the axes of said flanges, and a valve seat in said compartment, whereby there are but two changes in the direction of fluid flow through said body, the metal distribution about the axis of each of said passages being substantially uniform, the angles between said passages axes and the axes of said flanges being the minimum possible with any required height of valve seat and the dimension between the outer faces of said flanges.

14. In a forged steel valve, the combination of a forged steel body having a drilled compartment for a valve seat, substantially parallel pipe connection flanges having a common axis, and straight drilled passages through said flanges into said compartment above and below the valve seat location, said passages being at oblique angles to the axes of said flanges, and a valve seat in said compartment, whereby there are but two changes in the direction of fluid flow through said body, the metal distribution about the axis of each of said passages being substantially uniform, said passages entering said compartment immediately adjacent the upper and lower ends of said valve seat.

15. In a forged steel valve, the combination of a forged steel body having a drilled compartment for a valve seat, substantially parallel pipe connection flanges having a common axis, and straight drilled passages through said flanges into said compartment above and below the valve seat location, said passages being at oblique angles to the axes of said flanges, and a valve seat in said compartment, whereby there are but two changes in the direction of fluid flow through said body, the metal distribution about the axis of each of said passages being substantially uniform, said passages entering said compartment immediately adjacent the upper and lower ends of said valve seat and at their outer ends being substantially centered in the corresponding flanges.

In witness whereof, I hereunto subscribe my name this 14th day of October, A. D. 1930.

WALTER W. MOHR.